Figure 1:
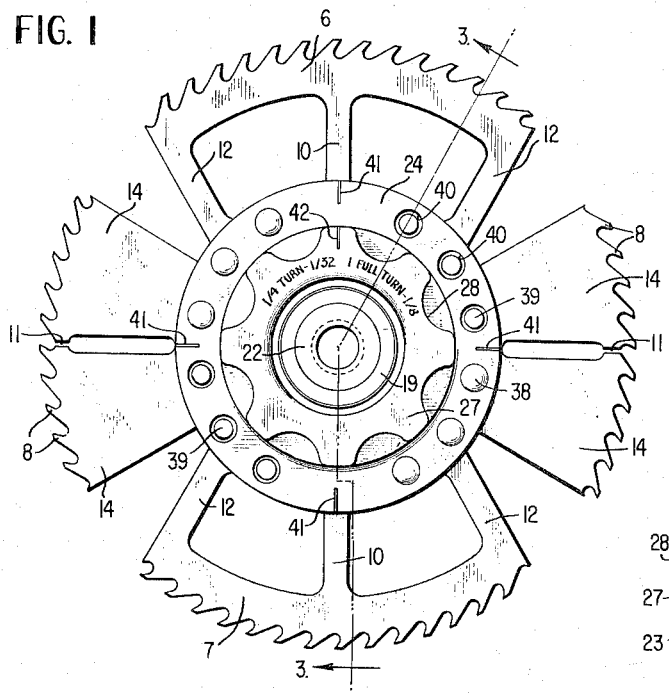

Aug. 3, 1965    E. D. ROBERTS    3,198,227
EXPANDABLE SAW BLADE
Filed March 18, 1963    2 Sheets-Sheet 1

INVENTOR.
EMORY D. ROBERTS
BY
*George A. Tew*
ATTORNEY

Aug. 3, 1965
E. D. ROBERTS
3,198,227
EXPANDABLE SAW BLADE
Filed March 18, 1963
2 Sheets-Sheet 2
FIG. 4
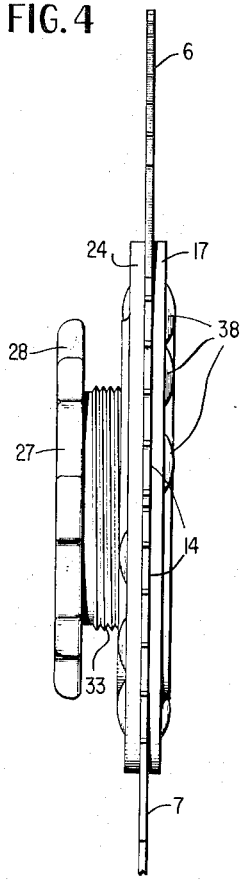
FIG. 6
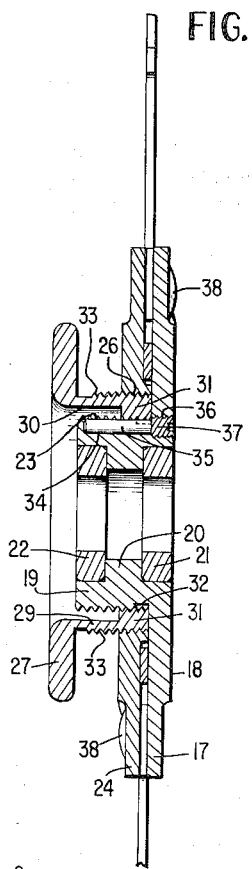
FIG. 5
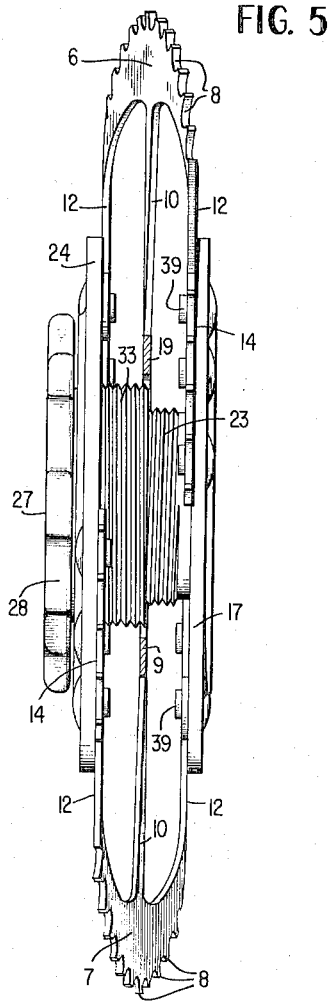
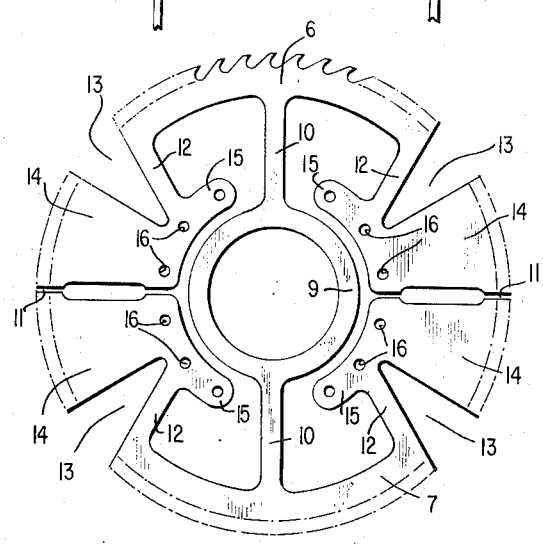
FIG. 7
INVENTOR.
EMORY D. ROBERTS
BY *George A. Tew*
ATTORNEY

United States Patent Office 3,198,227
Patented Aug. 3, 1965

3,198,227
EXPANDABLE SAW BLADE
Emory D. Roberts, 19159 Calvert St., Reseda, Calif.
Filed Mar. 18, 1963, Ser. No. 265,682
2 Claims. (Cl. 144—239)

This invention relates to a circular saw blade, and more particularly to such a saw blade, made in sections, the respective sections of which may be expanded to thereby vary the width of the cut taken by the saw.

An important object of the invention is to provide a circular saw blade, divided into a plurality of equal segments, said segments being capable of axial displacement with respect to one another to vary the width of the cut or rabbet taken by the saw during its working stroke.

The invention disclosed herein is an improvement over my prior Patent No. 2,995,163, patented August 8, 1961.

A further object of the invention is to provide a circular saw blade consisting of a plurality of substantially identical segments, the saw segments being connected together as by a central web or spider part, the central web having radiating arms, one each of which extends from the web to the respective segments.

The main object of the invention and the present improvement is directed to the hub structure of the saw, said hub including an actuating mechanism for expanding the respective saw segments or sections, which consists primarily of right and left hand threaded interengaging portions, whereby, by the turning of an operating member the segments or saw sections of the blade are moved oppositely with respect to each other to thereby vary the width or the rabbet cut by the blade.

A further object of the present invention is to provide the hub and the operating member with marked indicia to determine the width of cut the blade will take.

Another object of the invention provides a hole drilled lengthwise through the threads of the hub member of the saw blade, into which hole is positioned a nylon, Teflon or other synthetic plastic plug, the outer surface of the plug being positioned between the cooperating threads of the hub and saw blade expanding mechanism which tends to "lock" the threads in their adjusted positions and thereby prevents the blade segments from vibrating out of position while the saw blade is in use.

A further object of the present invention is to make the blade of only two segments, thereby preventing the segments from being influenced by the expanding spiral of the saw in expansion.

Another object of the invention is to provide the inner hub section of the saw with annular recesses for the reception of press fit bushings of various size whereby the saw is adapted to be mounted on different sized arbors.

Another important object of the present invention is directed to the compactness of the saw and the ease and convenience by which the blade sections or segments can be axially expanded or contracted with respect to each other without the necessity of the removal or the loosening of the saw from its fixed position upon an arbor.

Figure 3:
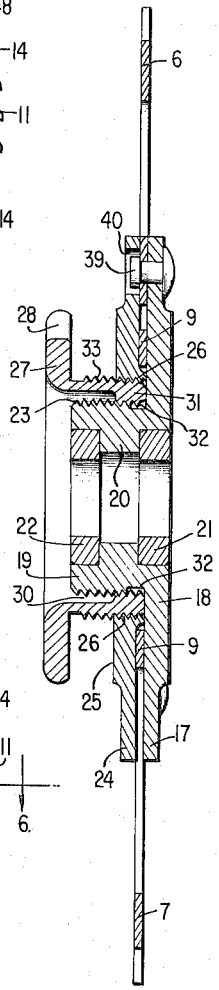
Figure 2:
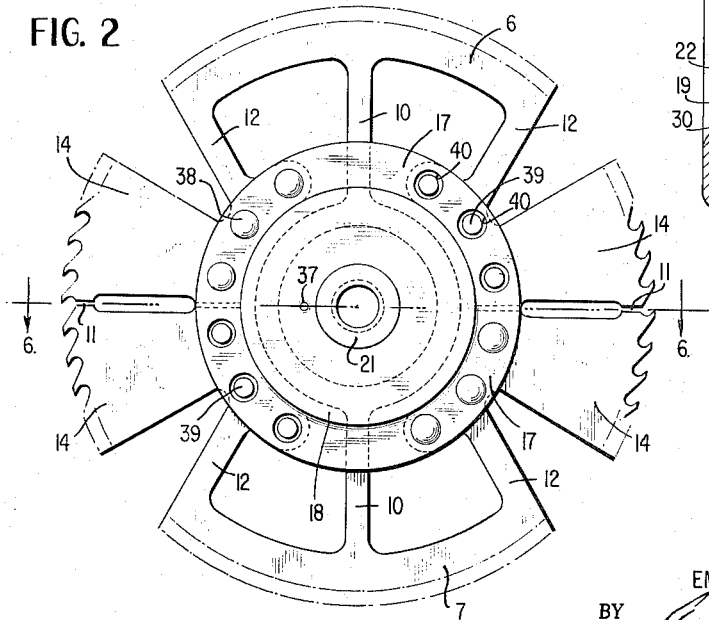

Other objects and advantages will become apparent to those skilled in the art when considered in connection with the following specification and accompanying drawings, in which:

FIG. 1 is a front face view of the saw blade;
FIG. 2 is a rear face view of the saw blade;
FIG. 3 is a section on the line 3—3 of FIG. 1;
FIG. 4 is a view in side elevation showing the blade unexpanded;
FIG. 5 is a view in side elevation showing the blade in an expanded condition;
FIG. 6 is a section on the line 6—6 of FIG. 2; and
FIG. 7 is a plan view showing the blank from which the saw blade is made.

Referring specifically to the drawings in which like numerals have been used to indicate similar parts throughout the various views, the saw blade comprises a pair of substantially identical sections or segments 6 and 7 which are provided completely along their outer edges with a series of usual cutting teeth 8. The two segments 6 and 7 are substantially identical and are supported by a central web or spider 9 having radiating arms 10, the arms 10 being formed as an integral part of the web or spider 9 and likewise being integral parts of the sections or segments 6 and 7. Each of the saw segments 6 and 7 are divided from each other as indicated at the slit or severed portion 11 thereby dividing the blade into two substantially identical half portions so that the segments can be moved axially with respect to one another to thereby vary the width of the cut of the blade. The segments 6 and 7 are each provided with two inwardly extending like leg portions 12, the segments having been cut away as by substantially V-shaped cuts 13 to form enlarged inwardly extending members 14, the leg portions 12 and the members 14 terminating in arcuate portions 15 spaced from the spider 9. The arcuate members 15 are each provided with a plurality of rivet receiving openings 16. By such construction it will be seen that each of the segments are capable of free axial movement with respect to each other, as when the blade segments are being expanded.

The saw blade is provided with a rear or back circular plate 17 including a thickened center portion 18 to give strength to the plate. The circular plate 17 adjacent its center portion includes an inwardly extending hub 19, said hub being provided to receive a usual saw arbor (not shown), the hub being provided on its inner surface substantially midway between the back and front sides thereof with a circular flange 20, said flange providing circular front and rear recesses within which may be press fitted arbor bushings 21 and 22. The bushings 21 and 22 are for the purpose of mounting the blade on a saw arbor as is well known in the art. It should be stated that the particular size of the bushings 21 and 22 may be selected and interchanged within their recesses whereby various sized bushings can be selected so that the saw blade can be mounted on arbors of varying sizes. The hub 19 of the saw blade is provided along its outer circumference with screw threads 23, which in the illustration shown are right hand threads.

The saw includes a circular front or face plate 24, quite similar to the circular rear plate 17, and being provided with a thickened center portion 25 to likewise give the face plate strength. The circular portion of the face plate 24 is provided with a central circular opening, which opening is provided along its inner circumference with screw threads 26. The saw blade is provided with a circular operating handle 27, the handle being provided along its outer enlarged end with enlarged finger engaging knurls as at 28 to permit ease of grasping and turning the operating handle. The handle 27 terminates in an inwardly extending circular wall 29 which comprises a counter bore 30 terminating in an enlarged inner end as at 31. The inner circumference of the enlarged end 31 is provided with threads 32, while the outer portion of the circular wall 29 is provided with threads 33. It will be noted that the threaded inner part 32 of the enlarged portion 31 is substantially only one-half the length of the outer threaded portion 33 of the wall part 29 of the handle actuating member 27. The inner threaded portion 32 is threadedly engaged with the threaded portion 23 of the hub 19, while the outer left hand threads 33 of the actuating handle 27 are in engagement with the threaded portion 26 of the circular center opening of the inner center plate 24. Referring more specifically to FIG. 6 it will be seen that the hub 19 is provided with a hole 34 drilled lengthwise of the threads 23 to receive within such hole 34 a plug 35 of nylon or other synthetic plastic which includes some coefficient of expansion under pressure, it being seen that the longitudinal outer surface of the plug lies approximately flush with the outer surface of the threads 23 and thus is disposed in contact with the threaded portion 32 of the member 31 of the actuating member 27. The inner face plate 17 is provided with a threaded opening 36 which is registered with the drilled hole 34 to receive a threaded metal locking screw 37 the inner end thereof engaging the outer end of the plug 35 to wedge the same within the recess or hole 34. Thus, when the actuating handle is turned causing the threads 32 to move longitudinally along the threaded portion 23, the nylon plug or insert, having its outer longitudinal surface disposed between these two sets of threads, tends to wedge or become distorted under pressure imposed by the movement of the respective threaded members and acts to "lock" or hold the respective members 31 and 19 in any of their various adjusted positions and consequently prevents the members from moving under vibration set up by the saw blade as it is rotated in its cutting condition.

The saw segments 6 and 7 of the blade have their arcuate segments 15 alternately connected as by rivets 38 to the respective front and rear plates 17 and 24 of the blade. Thus, it will be seen that the saw segment 6 has the arcuate member 15, as viewed in FIG. 7, connected to the front plate 17, while the arcuate member 15 at the opposite side of the blade is connected as by rivets 38 to the rim of the rear plate. Likewise, the right hand arcuate segment 15 of the saw segment 7 is connected as by rivets 38 to the rim of the rear plate 24 and the opposite arcuate segment 15 of the segment 7 is riveted to the rim of the front plate 17, the various arcuate portions having openings 16 to accommodate the rivets 38. Consequently, it will readily be recognized and understood that the respective arcuate segments 15 of the respective saw sections 6 and 7 are riveted alternately to the front and rear plates 17 and 24 of the saw. The rivets 38 are provided with enlarged base portions 39, and therefore, in order that the respective saw segments 6 and 7 be capable of moving to an aligned or single straight line position so that the saw can be used to make its narrowest cut, the front and rear plates 17 and 24 are provided with alternate enlarged recesses or openings 40, which openings, when the blade is in its completely unexpanded position, the enlarged rivet portions 39 will seat within the complementary openings 40 of the alternate front and rear plates. Consequently, when the blade is moved to its fully unexpanded condition, the blade sections are in aligned position and, therefore, make a cut of a minimum thickness when used in this condition. The spider or web portion 9 is of sufficient circular size to freely pass the outer threads 33 of the operating handle 27; and when the saw sections are in their unexpanded position, the spider 9 fits and is engaged between the enlarged sections 18 and 25 of the front and rear plates 17 and 24, respectively.

The like arcuate portions 15 of the respective segments 6 and 7, and heretofore pointed out, are provided with leg members 12 and somewhat enlarged members 14, which members serve the purpose of strengthening the segments 6 and 7 and consequently prevent the segments from vibrating when the saw is in use, especially in its expanded positions. Thus, each segment 6 and 7 is made much stronger because of the added leg members 12 and the parts 14 extending from the rather enlarged arcuate members 15, and the V-shaped grooves which have been cut out to form the members 12 and 14, permit the respective sections 6 and 7 to move axially, as when the blade is expanded, but still preserves the desired strength and ruggedness of the blade of helps to prevent vibration of the blade in use.

When the blade is moved, as by the operating handle 27 to an expanded position, the nylon or plastic plug 35, which is wedged between the threaded sections of the threads 23 and 32 has the effect of "locking" the threads and consequently holds the segments in their expanded positions.

The rear plate 24 of the saw is provided with four marks or kerfs 41, spaced at 45 degrees from one another along the outer edge of the plate 24, while the actuating handle 27 has a mark or kerf 42 disposed along one of the outer extremities of one of the knurls 28, it being marked on the knurl 28 so that the kerf 42 will register or line up with one of the kerfs 41. In the saw's completely unexpanded position the kerf or mark 42 registers with one of the kerfs or marks 41 and indicia on the actuating handle 27 indicates that if the handle is turned by one-quarter turn so that the mark 42 registers with the next adjacent mark 41, that the cut or rabbet taken by the saw will be a cut having a width of one-thirty-second of an inch wider than the width of the saw blade itself, and if the handle be turned one full or complete turn, then the blade has been expanded to take a cut of one-eighth of an inch. Thus, with such markings the blade can be expanded to take many various width cuts determined by the extent to which the handle has been turned.

In the operation of the saw blade, it is first mounted on the usual saw arbor and preferably the respective saw segments lie flush between the front and rear plates, in which position the saw and the segments are in their unexpanded position. In this position the saw can be used as any normal circular saw blade and can be used to cut off boards or the like or to make a rabbet or groove in the face of material being worked upon. When it is desired to increase the width of the rabbet being cut, it is only necessary to stop the saw, which, of course, is fixedly mounted upon the arbor and holding the blade in the left hand to prevent turning of the arbor, the actuating member or handle 27 is gripped by the right hand in the corrugations or indentations 28 provided, whereupon the handle or actuating member is turned to the right as viewed in FIG. 1. In consequence of such turning and further because the threaded portions 23 and 33 are different handed threads, turning of the actuating member 27 will cause the same to start movement outwardly or away from the back plate 17 of the saw as along the threaded hub 23, and at the same time the front plate 24 with its threads 26 will start to move out along the threaded portion 33 of the actuating member. Consequently, with the right and left handed threads 23 and 33, "double" action is obtained whereby the actuating member moving along the threads 23 carries the front plate 24 and the arcuate portions 15 of the segments which are attached thereto outwardly or away from the back member of the saw, while at the same time the front plate 24 with its threaded portions 26 engaging the left hand threads 33 of the actuating member likewise moving the front plate 24 away from the rear plate 17. Thus, the saw can be completely expanded to the position shown in FIG. 5 where the center portion 25 of the front plate 24 abuts the under surface of the actuating member 27 to completely expand the saw in which position the greatest width rabbet or groove is capable of being cut and, of course, the width of the rabbet is determined by the amount of movement of the actuating member 27, whereby the grooves of various or predetermined widths may be cut as desired. It will be seen that when the circular portion 25 of the front plate 24 is moved outwardly to engagement with the under surface of the actuating member 27 that the threaded portion 26 of the actuating member 27 has reached its limit of movement along the threads 23 of the hub 29, and consequently, there is no possibility of separation of the respective saw parts.

As previously pointed out, the invention provides a unique manner of adjusting the respective saw segments to provide varying widths of rabbet cuts, the saw being compact in nature, being capable of receiving various sized bushings which will accommodate various sized arbors, and once the saw blade has been fixed to the arbor, it is only necessary to stop the rotation of the arbor and hold the blade and without removing the blade from the arbor or any other adjustment, the segments can be moved with respect to each other, and consequently, vary the width of the cut desired.

A preferred embodiment of the invention has been disclosed, but it is not intended that the invention be limited to the exact construction shown, but the same be capable of variation and modification within the scope of the following claims.

I claim:

1. An expandable saw blade comprising a blade having a central spider and integral legs radiating from the spider and attached to respective segments of the blade, the respective segments of the blade being detached from each other and each segment having inwardly directed arms, front and rear blade plates, the rear plate terminating in an inwardly directed hub threaded along its outer surface and provided with an arbor receiving opening through its inner surface, the inner open surface having annular bushing receiving recesses, the front blade plate having a central threaded opening and an actuating member provided with a handle part and a sleeve part, the sleeve part provided with threads along its inner and outer surfaces, the inner threads engaging the threads along the hub of the first plate, the outer threads being threaded oppositely to those of the hub portion and engaged with the threaded portion of the front plate, the inwardly directed pairs of arms of each of the segments attached alternately to the front and rear saw plates, whereby turning of the saw actuating member either expands or contracts the respective saw segments to vary the rabbet cut by the saw.

2. An expandable rotary saw blade, comprising a central spider and a plurality of segments each having a leg connected to and extending inwardly from the segments to the spider, each segment having inwardly directed arms, front and rear plates to which the arms of the segments are alternately connected, the rear plate terminating in an inwardly directed exteriorly threaded hub portion, said front plate having a threaded opening therein, and an actuating member including a sleeve portion, said sleeve portion including inner and outer threaded parts, the inner threads of the actuating member mating the threaded hub portion and the outer threads of the actuating sleeve member being reversely threaded, whereby upon turning of the actuating member the said plates are separated to thereby expand the saw segments.

References Cited by the Examiner

UNITED STATES PATENTS

| | | | |
|---|---|---|---|
| 314,637 | 3/85 | Wolcott | 143—155.2 |
| 1,556,947 | 10/25 | Madsen et al. | 254—102 |
| 1,635,397 | 7/27 | Barkholder | 254—102 |
| 1,736,970 | 11/29 | Hass | 143—155 |
| 2,683,476 | 7/54 | Courcier | 144—238 |
| 2,913,031 | 11/59 | McKay et al. | 151—7 |
| 2,995,163 | 8/61 | Roberts | 144—239 |

LESTER M. SWINGLE, *Primary Examiner.*

WILLIAM W. DYER, Jr., *Examiner.*